United States Patent [19]
Herrmann et al.

[11] Patent Number: 5,762,361
[45] Date of Patent: *Jun. 9, 1998

[54] AIRBAG ARRANGEMENT

[75] Inventors: Gert B. Herrmann, Solingen; Martin Ritter, Neu-Ulm; Alexander Nann, Dornstadt; Andreas Schuster-Woldan, Gräfelfing; Benedikt Heudorfer, Nersingen/Leibi; Gerhard Klingauf, Illerrieden; Thomas Lung, Ulm, all of Germany

[73] Assignee: Takata (Europe) Safety Technology GmbH, Ulm, Germany

[*] Notice: The term of this patent shall not extend beyond the expiration date of Pat. No. 5,658,008.

[21] Appl. No.: 828,604

[22] Filed: Mar. 31, 1997

Related U.S. Application Data

[63] Continuation of Ser. No. 502,233, Jul. 19, 1995, Pat. No. 5,658,008.

[30] Foreign Application Priority Data

| Jul. 19, 1994 | [DE] | Germany | 44 25 495.4 |
| Sep. 28, 1994 | [DE] | Germany | 44 34 685.9 |
| Jun. 9, 1995 | [EP] | European Pat. Off. | 95 108 905 |

[51] Int. Cl.$^6$ ................................................. B60R 21/16
[52] U.S. Cl. ............................. 280/728.2; 280/728.3
[58] Field of Search ......................... 280/728.2, 728.3, 280/731, 732

[56] References Cited

U.S. PATENT DOCUMENTS

| 5,167,427 | 12/1992 | Baba . | |
| 5,201,541 | 4/1993 | Jones et al. | 280/728.2 |
| 5,312,129 | 5/1994 | Ogawa . | |
| 5,326,131 | 7/1994 | Yokota . | |
| 5,368,327 | 11/1994 | Shiraki . | |
| 5,409,256 | 4/1995 | Gordon et al. | 280/728.2 |
| 5,527,063 | 6/1996 | Garner . | |

FOREIGN PATENT DOCUMENTS

| 0 376 564 A1 | 7/1990 | European Pat. Off. . |
| 447030 | 9/1991 | European Pat. Off. . |
| 0 485 600 A1 | 5/1992 | European Pat. Off. . |
| 0 582 443 A1 | 2/1994 | European Pat. Off. . |
| 2137833 | 2/1972 | Germany . |
| 9014749 U | 3/1991 | Germany . |
| 42 05 726 A1 | 9/1992 | Germany . |
| 42 26 231 A1 | 2/1993 | Germany . |
| 43 17 737 A1 | 12/1993 | Germany . |
| 43 21 226 A1 | 1/1994 | Germany . |
| 4-55143 | 2/1992 | Japan . |
| 4-55148 | 2/1992 | Japan . |
| 1773247 | 10/1992 | U.S.S.R. . |

OTHER PUBLICATIONS

"Air Bag Device", *Patents Abstracts of Japan*, 5-294201 (A) , M-1558, Feb. 10, 1994, vol. 18, No. 83.

"Air Bag Device", *Patents Abstracts of Japan*, 4-169356 (A) , M-1318, Sep. 30, 1992, vol. 16, No. 471.

Primary Examiner—Paul N. Dickson
Attorney, Agent, or Firm—Fitch, Even, Tabin & Flannery

[57] ABSTRACT

An improved airbag arrangement in motor vehicles is described having at least one gas generator, a generator carrier, a folded together gas bag having at least one opening which receives the gas generator and a pot-like cover which accommodates the folded together gas bag, with the base of the pot-like cover being capable of being broken open by means of the gas bag expanded by the gas generator and with the marginal region of the cover remote from the base being connected to the generator carrier.

9 Claims, 12 Drawing Sheets

AIRBAG ARRANGEMENT

This is a continuation of application Ser. No. 08/502,233, filed Jul. 13, 1995, now U.S. Pat. No. 5,658,008.

BACKGROUND OF THE INVENTION

The invention relates to an airbag arrangement in accordance with the preamble of claim 1.

In the case of accident-dependent accelerations of the vehicle into which the airbag arrangement is built a pyrotechnical charge in the gas generator ignites and causes hot gases which emerge from preferably radial bores provided there to flow into the folded up gas bag, which then inflates while breaking open the cover and protects the vehicle occupant from too hard an impact.

With known arrangements of this kind (EP 0 376 564 A1, DE 42 05 726 A1) the problem exists that a relatively large number of individual parts is necessary and the assembly requires such a large effort that an economical manufacture, in particular in mass production, is not possible. Furthermore, the gas bag must be provided with a bead at the opening. This is also the case with a gas sack in accordance with DE 90 14 749 U.

SUMMARY OF THE INVENTION

The object of the present invention is to provide an airbag arrangement of the initially named kind which consists of as few individual parts as possible and which can be manufactured and installed in a particularly economical manner.

The features of the characterising part of claim 1 are provided in order to satisfy this object.

The concept underlying the invention is thus to be seen in clamping the marginal region of the gas bag at the opening between two areal components extending all around the opening which are in any event present, or which can be additionally provided without particular expense or complexity.

The possible design in which the marginal region of the gas bag at the opening is clamped between the inner wall of the marginal region of the cover and a wall part of the generator carrier which extends at least substantially parallel to the inner wall, enables particularly simple manufacture. For this the folded together gas bag which is premanufactured, for example in a low labour-cost country, is simply laid into the pot-like cover with the marginal region at the opening coming into contact with the marginal region of the cover. The generator carrier which carries the generator now only needs to be inserted axially whereupon, as a result of suitable dimensioning of the individual components, the sealed connection of the marginal region of the gas bag at the opening with the components surrounding it has already been largely completed. This clamping can subsequently be further reinforced by fastening means or retained in the existing form. The marginal region of the gas bag at the opening thus represents a type of collar which cooperates with the collar-shaped regions complementary thereto, namely the marginal region of the cover and the wall part, to form a sealed connection. In this arrangement the separate premanufacture of the gas bag and the manufacture and joining together of the high value parts in a workshop equipped with high value manufacturing tools enables particularly favourable manufacture.

With a circularly symmetrical design of the airbag arrangement the wall part, the marginal region at the opening and the marginal region of the cover represent right cylinders or cones which taper slightly in the direction of the base. The cross-section of the arrangement can however basically be selected as desired, i.e. can also be rectangular or square. Moreover, instead of only one gas generator several gas generators can also be provided at the generator carrier.

The embodiment of claim 2 is particularly advantageous since the laying of the end region of the marginal region at the opening around the end edge of the marginal region of the cover facilitates the axial insertion of the generator carrier during installation and the danger of the marginal region at the opening being displaced on insertion of the generator carrier is avoided.

A particularly advantageous fastening method is the use of fastener clips distributed around the circumference because the fastener clips can be provided in one piece with the generator carrier during manufacture thereof. The assembly of the wall part of the generator carrier, of the marginal region of the gas sack at the opening and of the marginal region of the cover can be improved by fastening bores. Particularly advantageous is a design which ensures a connection of the individual parts in a single riveting step.

The preferred frame-like design of the generator carrier has the advantage that, by suitable dimensioning of the frame width, the spacing of the hot gas outlet bores of the gas generator from the radially oppositely disposed marginal region at the opening can be selected in such a way that, on triggering of the gas generator, the hot outflowing gases cannot damage the gas bag in the marginal region at the opening.

The provision of a step in the frame part is particularly advantageous since in this way the hot gas jets from the gas generator primarily impinge onto the step which in particular extends obliquely and are axially deflected in the direction towards the gas bag as a result of a suitable inclined position of the step, so that only regions of the gas bag are struck by the hot gas which are being blown up rapidly and are thus being removed relatively quickly from the hot gas flux.

The design of claim 7 makes particularly favourable production possible with a secure installation also being ensured.

The arrangement in accordance with which the frame part is formed as an at least substantially planar plate with an opening for receiving the generator and is connected to the end of the wall part remote from the base of the cover, with the marginal region at the opening which is directed there being clamped between the plate and a preferably planar cover pan having an opening for receiving the generator and arranged at the side of the plate remote from the base of the cover and is preferably connected to the plate by fastening elements, and with the cover pan extending in the direction away from the central axis up to and beyond the marginal region of the cover, enables a reliable attachment despite the parts that are used being extremely simple to manufacture.

The arrangement in accordance with which the cover pan extends up to the outer circumference of the edge region of the cover and continues there in a flange which contacts the marginal region of the cover from the outside in the direction towards the central axis brings about a centering of the generator carrier in the cover without having to take further measures.

The arrangement in accordance with which the marginal region of the cover has at least one rib projecting inwardly towards the central axis with a complementary recess of the wall part lying opposite to the rib in the direction of the central axis in such a way that the generator carrier is held axially in both directions after the connection to the cover pan permits, after assembly, first the transport and then the installation of the finish assembled arrangement. No further measures have to be taken in order to keep the arrangement together. Moreover, the arrangement holds the cover so firmly in connection with the gas generator in the installed arrangement that it remains reliably attached thereto even when the gas generator is ignited.

The arrangement in accordance with which the flange extends in the direction towards the base of the cover beyond the rib ensures, on triggering of the gas generator, that the marginal region of the cover, which is for example formed from a resilient plastic or from a plastic which softens under the heat of the hot gases escaping from the gas generator, cannot bulge outwardly in the surrounded region even under high gas pressure, whereby the opening region of the gas bag is in particular particularly safely clamped and a reliable seal is simultaneously obtained.

The arrangement in accordance with which axial slots are provided in the wall of the cover in such a way that the generator carrier can be slid axially into place between the axial slots from the outside by resilient spreading of the marginal region of the cover simplifies the installation.

The arrangement in accordance with which, with a rectangular cross-section of the marginal region of the cover and the wall part, the corner regions are differentially curved, so that a space is provided for receiving the turned over folds which are formed on laying of the gas bag onto the wall part, reduces the force that is required during installation and simultaneously counteracts tearing of the gas bag, in particular in the region of the turned over folds.

BRIEF DESCRIPTION OF THE DRAWINGS

The invention will now be described in the following by way of example and with reference to the drawing in which are shown.

DETAILED DESCRIPTION OF PREFERRED EMBODIMENTS

Figure 1:
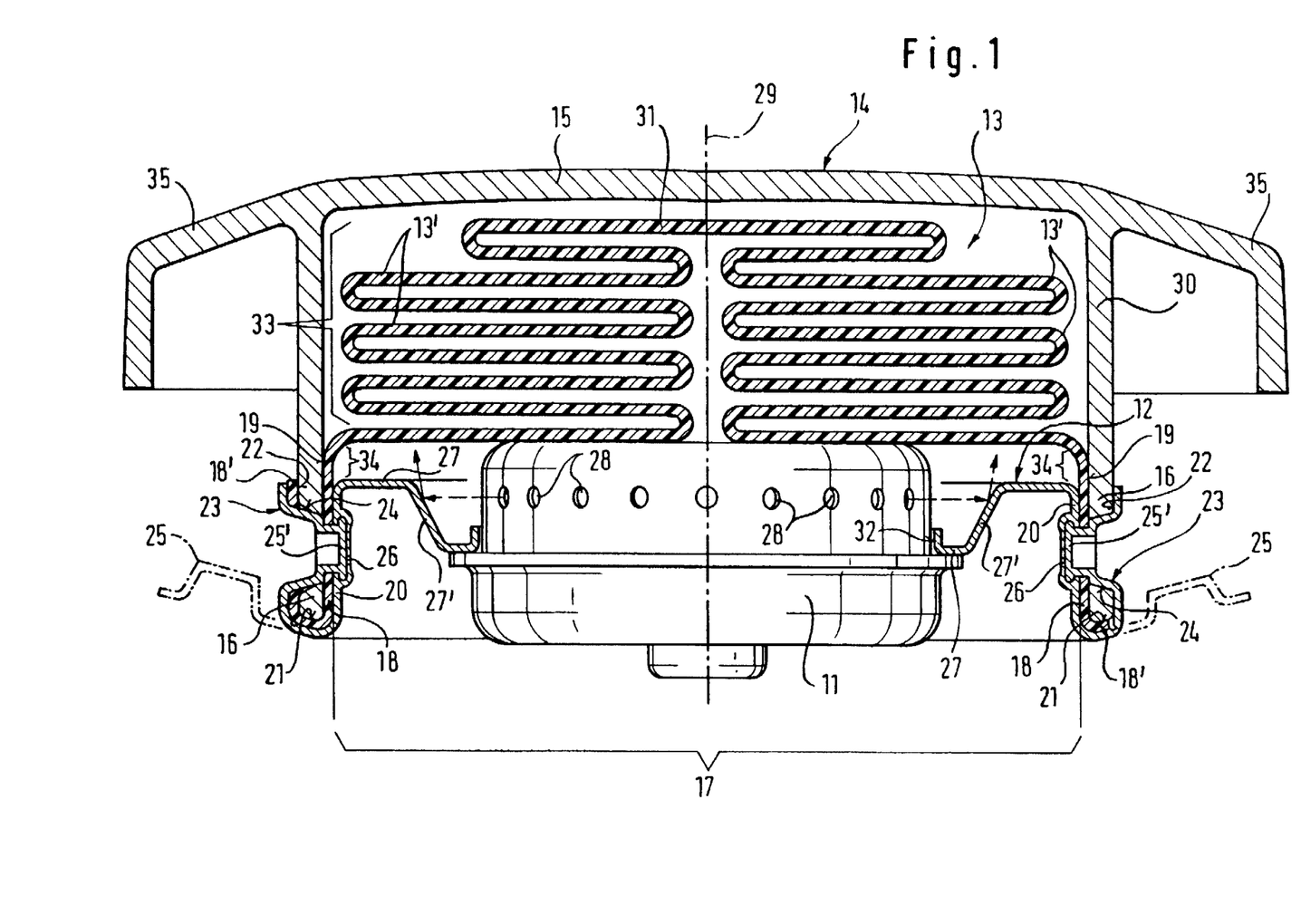
FIG. 1 a cross-section through an airbag arrangement in accordance with the invention with a somewhat different embodiment being shown so the left of the central axis 29 from that at the right, and with the overall arrangement being rotationally symmetrical relative to the central axis 29, FIG. 2 a corresponding sectional view of a further advantageous embodiment in accordance with the invention, FIG. 3 a corresponding schematic section of another embodiment in accordance with the invention, FIG. 4 a corresponding schematic section shown only to the left of the central axis 29 of an embodiment of the invention having a fused connection, FIG. 5 a perspective partial view of a generator carrier in accordance with the invention which can be used for the manufacture of the fused connection of FIG. 4, FIG. 6 a section from the region to the right of the central axis 29 of FIG. 4 during the manufacture of the fused connection by means of a tool in accordance with the invention, FIG. 7 an enlarged partial sectional view of an embodiment of an airbag arrangement in accordance with the present invention in the region of the connection of the generator carrier to the cover, FIG. 8a a corresponding view to a reduced scale without the cover and the gas bag, FIG. 8b a plan view of the article shown, FIG. 8c a corresponding side view, FIG. 8d a partly cut away perspective view of the article shown in FIGS. 8a to 8c, FIG. 9 an enlarged partial sectional view analogous to FIG. 7 of a further embodiment of the present invention, FIG. 10a a corresponding view to a reduced scale without the cover and the gas bag, FIG. 10b a plan view of the article shown, FIG. 10c a corresponding side view, FIG. 10d a partly broken away perspective view of the part shown in FIGS. 10a to 10c, FIG. 11 a further embodiment of an airbag arrangement in accordance with the invention in section to the left of the central axis and in a side view to the right of the central axis, FIG. 12 an enlarged illustration of the region XII in FIG. 11, FIG. 13 a plan view of the airbag arrangement of FIG. 11, and FIG. 14 a schematic section of the airbag arrangement of FIG. 11 along the line XIV—XIV from which the position of a space in the corner regions provided for receiving the folds of the gas bag formed during turning it over is evident, with the parts of the gas bag within the wall part having been omitted for the sake of simplification of the drawing.

In accordance with FIG. 1 a folded up gas bag 13 is provided in a pot-like cover 14 having a flat base 15 and a substantially right-cylindrical wall 30, with the central axis 29 corresponding to the cylinder axis. The closed end 31 of the gas bag is located directly opposite to the base 15 whereas an opening 17 provided at the opposite end accommodates a generator carrier 12. Radially inwardly the generator carrier 12 in turn has a receiving opening 32 for a gas generator 11 which is inserted and secured there. The gas generator 11 is of right-cylindrical shape and rotationally symmetrically arranged to the central axis 29. It has gas outlet openings 28 which are distributed around the circumference above the point of connection to the generator carrier 12. Hot gas jets emerge radially from the gas outlet openings when triggered.

It is important that a right-cylindrical edge region or collar 18 at the opening of the gas bag, with the central axis 29 as the cylinder axis, adjoins the region 33 of the gas sack disposed as folds 13' extending perpendicular to the central axis 29. The edge region or collar 18 at the opening contacts the inner wall 19 of the marginal region 16 of the cover of the wall 30 remote from the base 15.

In accordance with the invention the generator carrier 12 consists of a frame part 27 which surrounds the gas generator 11 and which represents a frame ring with the illustrated circularly symmetrical arrangement relative to the central axis 29. It has a radially outer wall part 20 bent down in the direction away from the base 15. In the illustrated embodiment the wall part 20 has essentially the form of a right cylinder. The diameter of the wall part 20 is so selected that its outer wall contacts the inner side of the marginal region 18 at the opening. This corresponds to a preferred arrangement in which the generatrices of the marginal region 18 at the opening and of the wall part 20 respectively extend parallel to one another. A further preferred arrangement results when the generatrices converge somewhat in the direction towards the base 15 of the cover 14.

The marginal region 18 of the gas bag 13 at the opening extends up to the end edge 21 of the marginal regions 16 of the cover remote from the base 15 and is there folded around the end edge towards the outside. In the embodiment shown to the right of the central axis 29 in FIG. 1 the turned around edge region 18' is practically only located in the region of the end edge 21. In contrast, in the embodiment shown to the left of the central axis 29 the turned around marginal region 18' extends over a considerable part of the outer wall 22 of the marginal region 16 of the cover in the direction back to the base 15.

The wall part 20 of the generator carrier 12 has a row or bendable clips 23 at its end remote from the base 15 with the clips preferably being formed in one piece with the wall part. The bendable clips 23 have fastener means at a spacing from the end edge 21' in the form of flat regions 25 which can be deformed in accordance with the through-joining method.

In FIG. 1 the bendable clip 23 and the fastener regions 25 are illustrated both in the starting position prior to being bent round and also in the finished installed position where a force clamp 25' of a through-set joint is generated by rivet-like deformation of the regions 25 and flowing together of these regions with the wall part 20 which is subjected to complementary deformation at 26.

In the region of each fastener clip 23 there is located, in the marginal region 16 of the cover, a radial securing bore 24 having a diameter adapted to the diameter of the force clamp 25'.

The manufacture and installation of the described airbag arrangement takes place as follows:

The gas bag 13 is manufactured from a folded together part 33 and a marginal region or collar 18 at the opening and can optionally be delivered as a prefinished part.

The further parts of the arrangement, namely the generator 11, the generator carrier 12 and the cover 14 can be separately manufactured with the cover 14 and the generator 11 assembled to the generator carrier 12 initially representing separate components.

Thereafter the gas bag 13 is first introduced in the folded together form into the internal space of the cover 14 in the manner shown in FIG. 1, with the edge region 18 at the opening being folded outwardly around the end edge 21 and thereby coming into contact with the inner wall 19 and, in the embodiment to the left of the central axis also with the outer wall 22 of the marginal region 16 of the cover.

The generator carrier which has already been assembled to the gas generator 11 or is formed in one piece with it is now pushed into place axially from the side opposite to the base 15 and the gas bag 13, with the wall part 20 sliding along the inner wall of the marginal region of the gas bag 13 at the opening until the position evident from FIG. 1 has been reached.

The bending clips 23 are now bent around the end edge 21 in the clockwise sense to the left of the central axis 29 and in the counter-clockwise sense to the right of the central axis 29 by means of a suitable non-illustrated tool, with the regions 25 being formed and being driven through the fastening bores 24, boring through the marginal region 18 of the opening and being riveted to the wall part 20 through formation of the complementary recesses 26. For this process a suitable tool can be provided which effects all bends and joining processes at the same time.

After connection of the deformed regions 25' to the wall part 20 by the formation of undercut recesses 26 the marginal region 18 at the opening 15 clamped to the wall part 20 and to the marginal region 16 of the cover in pressure-tight manner so that a reliable mounting of the gas sack 13 in the region of its opening 17 is ensured on ignition of the gas generator 11, and subsequent inflation of the gas bag 13 while breaking open the base 15 of the cover 14.

The step 27' in the frame ring 27 which is formed in the embodiment of FIG. 1 as a ring step which is conically broadened towards the base 15 is of particular importance. It lies radially opposite to the gas outlet bores 28. In this manner the hot gases which emerge out of the gas outlet bores 28 in the direction of the dashed arrows in FIG. 1 first reach the ring step 27' where they are deflected substantially in the direction towards the base 15 and thereby inflate the gas bag 13. In this manner the hot gases are largely kept away from the radially inwardly exposed and substantially stationary region 34 of the gas bag 13.

As a result of the design in accordance with the invention the generator carrier 12 can be shaped largely in any desired form providing only that it has the basic frame form which can be seen from FIG. 1. More than one generator 11 can also be secured to a generator carrier 12.

A substantially ring-like cover region 35 can also be provided around the base of the pot-like cover 14 which covers over the components lying behind it.

In the following figures the same reference numerals are used to designate components which have counter-parts in FIG. 1.

Figure 2:
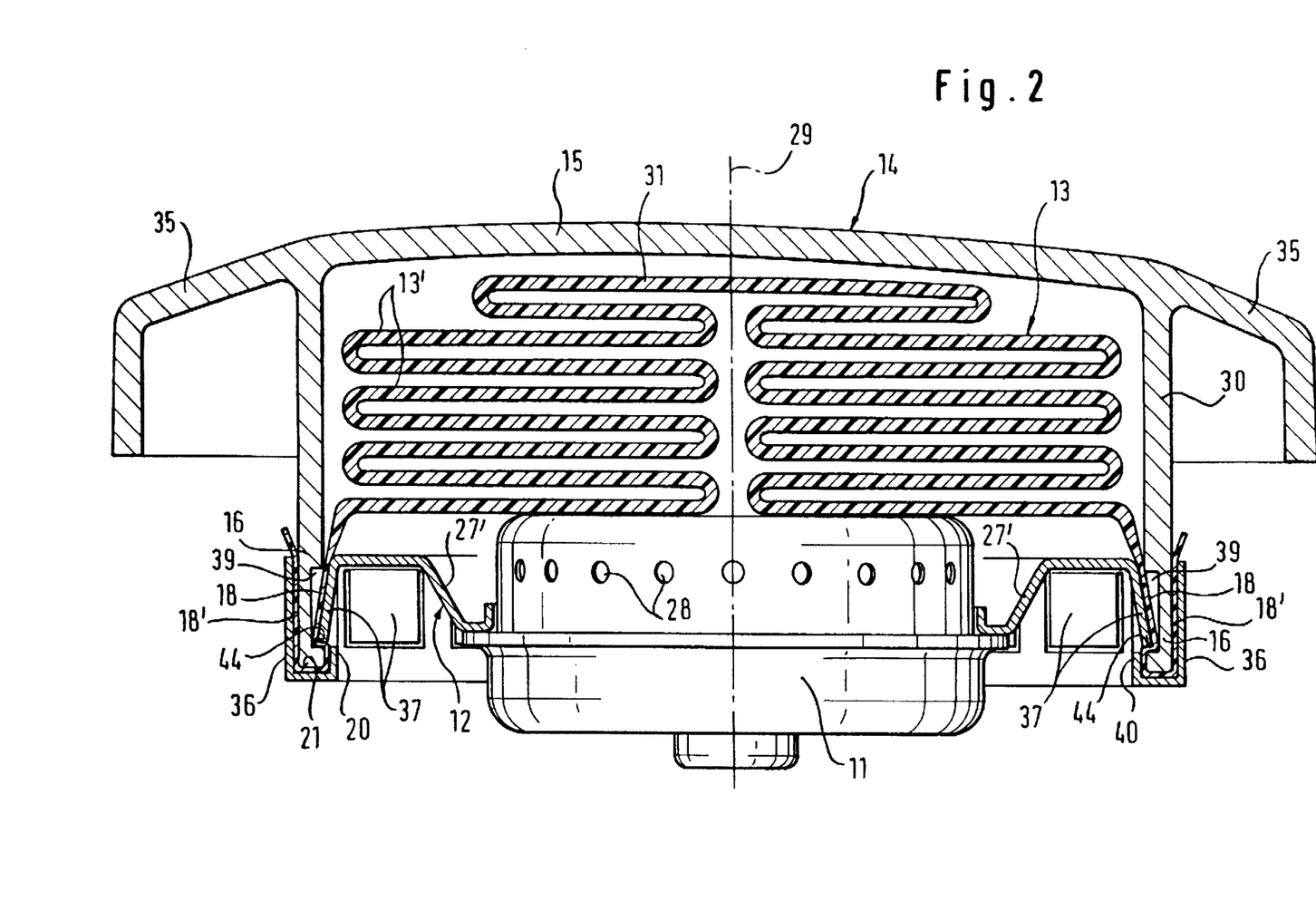

In the embodiment of FIG. 2 a clamping channel 36 which extends all around the axis 29 and has an essentially U-shaped cross-section adjoins the wall part 20 of the generator carrier 12 at the outside, with the clamping channel being open in the direction towards the base 15 of the cover 14. Snap hooks 37 are stamped and bent outwardly out of the wall part 20 belonging to the clamping channel 36 at specific intervals in the circumferential direction and engage in complementary snap recesses 39 at the inner side of the marginal region 16 of the cover, and indeed in such a way that the free end edge 44 of the snap hooks 37 engages in barb-like manner into the snap recess and thus prevents the generator carrier being drawn out downwardly from the position of FIG. 2.

The marginal region 18 of the gas bag 13 at the opening extends between the snap hook 37 and the snap recesses 39 in just the same way as between the wall part 20 and the marginal region 16 of the cover. At the free end edge 44 of the snap hooks 37 the gas bag is particularly effectively held during inflation.

Figure 3:
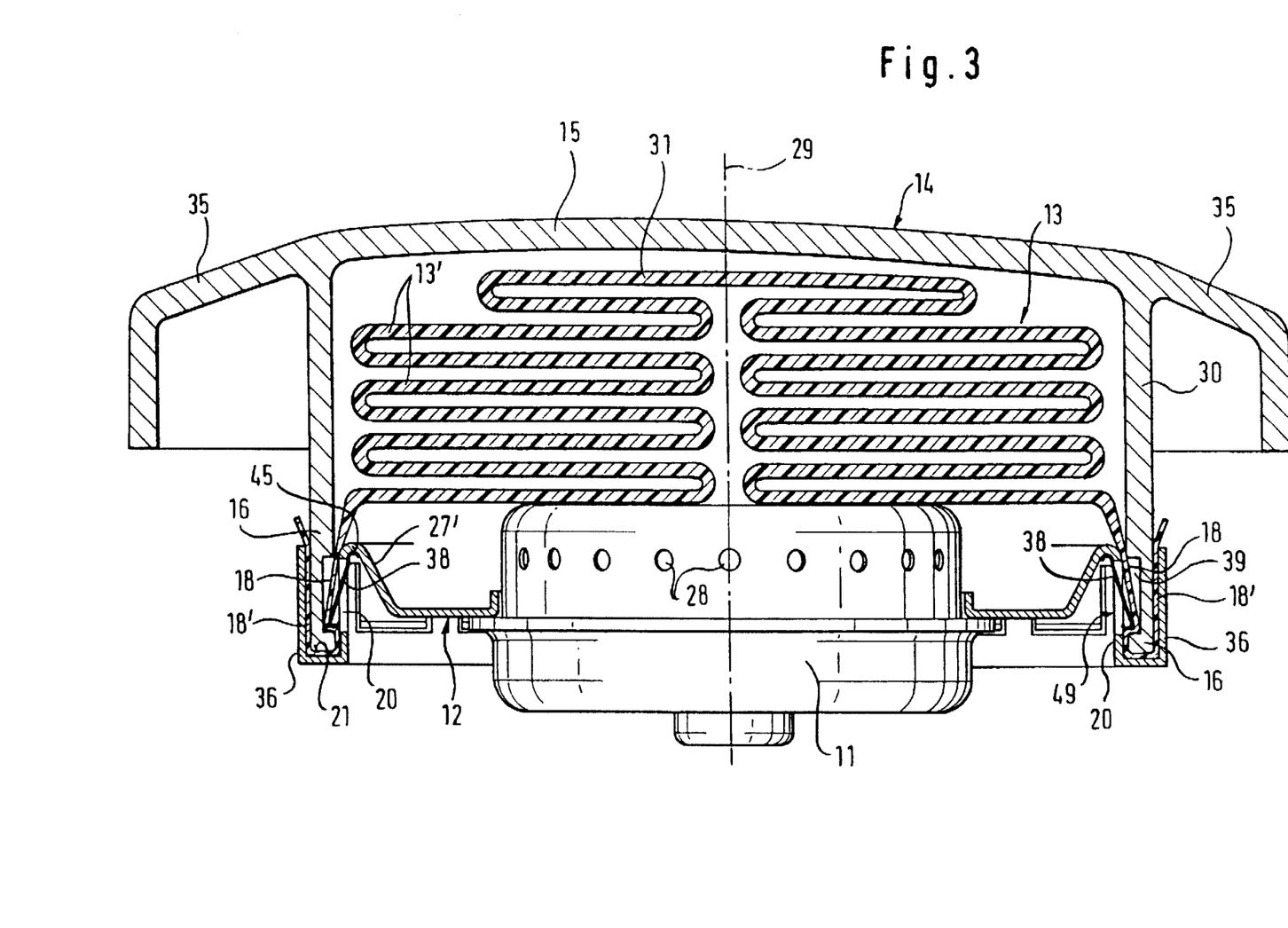

In the embodiment of FIG. 3 the wall part 20 has stamped out apertures 49 at the positions where the snap hooks 37 are provided in the embodiment of FIG. 2. Snap springs 38 are inserted into these apertures 49 and extend between a bearing groove 45 of the generator carrier 12 and the lower edge of the snap recess 39 in FIG. 3. In analogous manner to the snap hooks 37 of FIG. 2 the snap springs prevent the generator carrier 12 being extracted downwardly in FIG. 3 out of the marginal region 16 of the cover which surrounds it.

Figure 4:
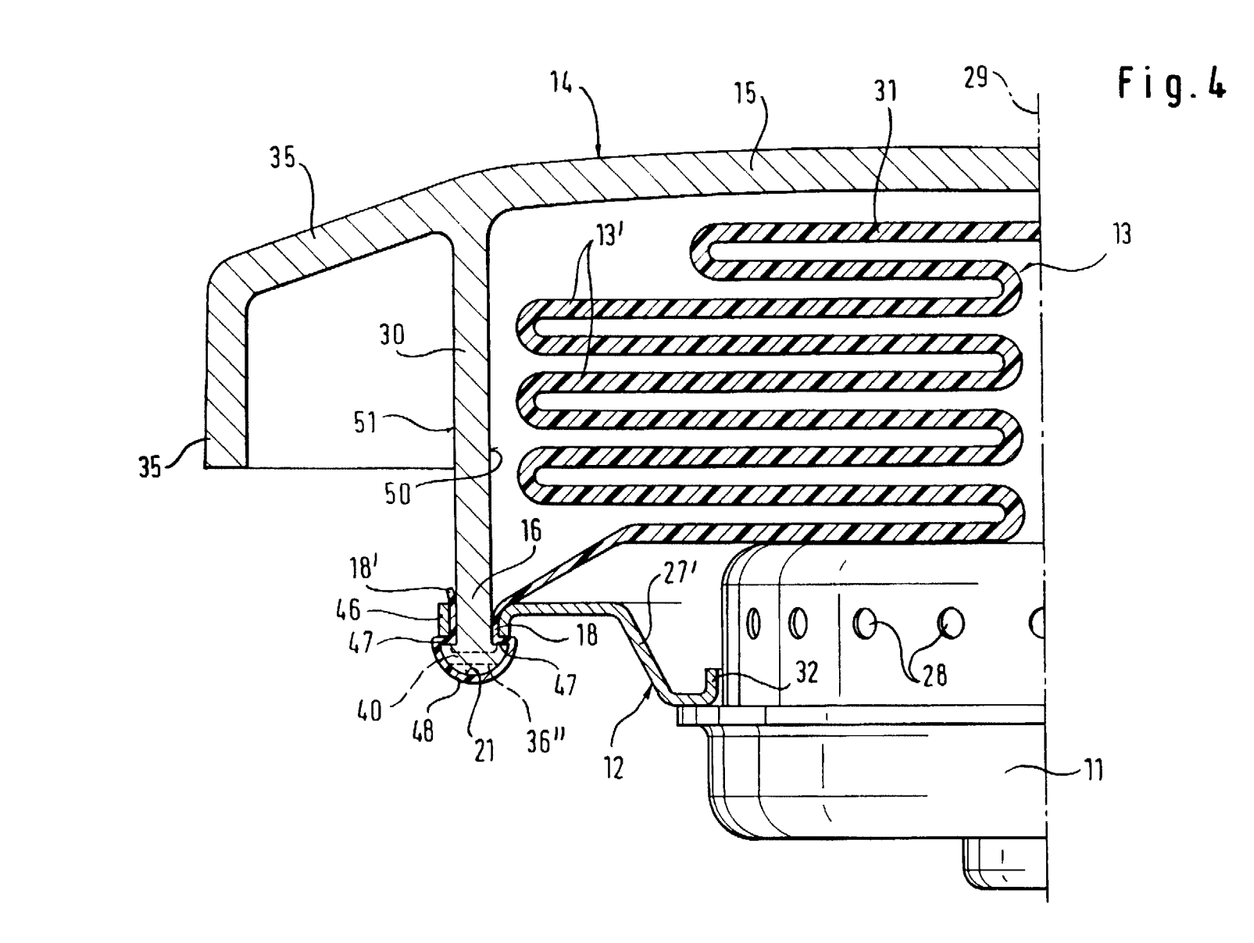
Figure 5:
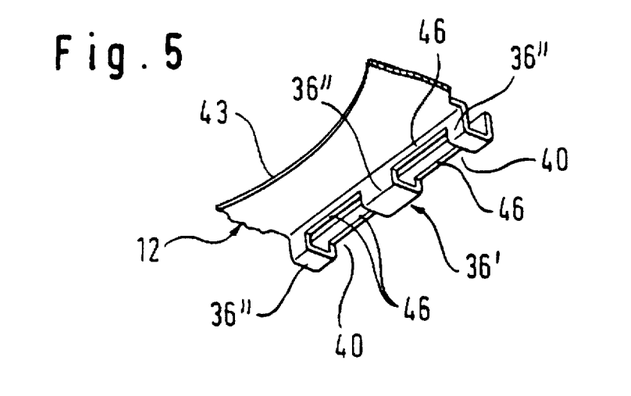
Figure 6:
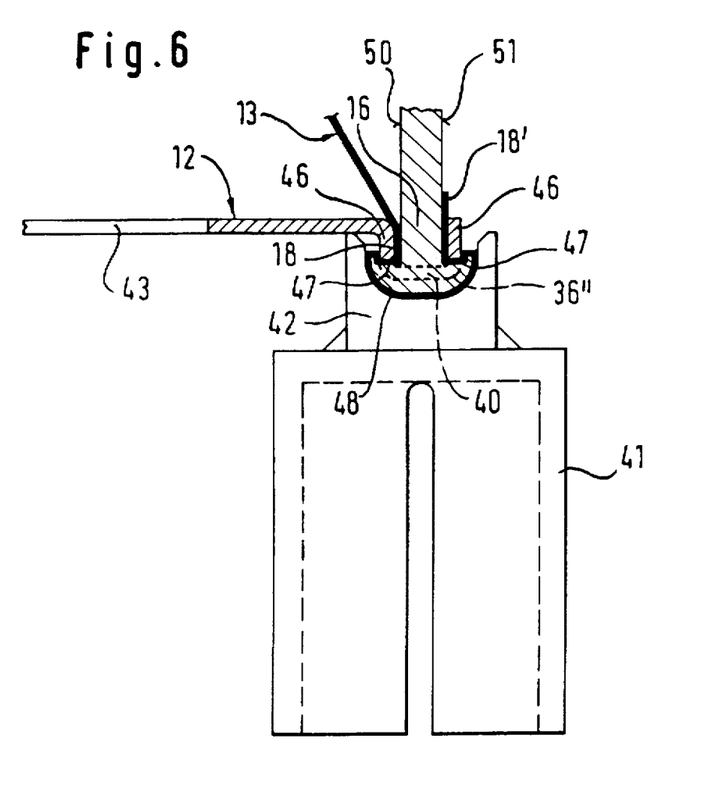

FIG. 5 shows in a perspective partial view a generator carrier 12 such as is used in the embodiment of FIGS. 4 and 6. The clamping channel 36' is here interrupted at intervals by apertures 40, however the individual remaining U-shaped regions 36" still remain connected by narrow webs 46.

If a clamping channel 36 of this kind is set in place in accordance with FIG. 6 onto the end of the marginal region 16 remote from the base 15 while trapping the marginal regions 18, 18' of the gas bag 13 and if this arrangement is heated up by the correspondingly shaped die 42 of a heatable tool 41 then the thermoplastic material of the marginal region 16 of the cover melts in the region of the clamping channel 36 in such a way that it flows, while expanding the parts of the marginal region 18 of the gas sack 13 surrounding the marginal region 16, into the apertures 40 and largely fills out the space predetermined by the die 42.

The shaped opening of the die 42 extends sideways up to and beyond the inner and outer walls 50, 51 of the marginal region of the cover, whereby the clamped marginal region 18, 18' of the gas bag 13 forms a step 47 to each side in the region of the apertures 40, with an arched region 48 which is approximately semicircular in cross-section extending between the steps 47. As the steps 47 extend laterally beyond the narrow webs 46 in the region of the apertures 40 a particularly good retention of the gas sack 13 in this region is ensured during the inflation.

In the further development of the above described airbag arrangements further advantageous embodiments are now possible which will be described with reference to the FIGS. 7 to 13.

Figure 7:
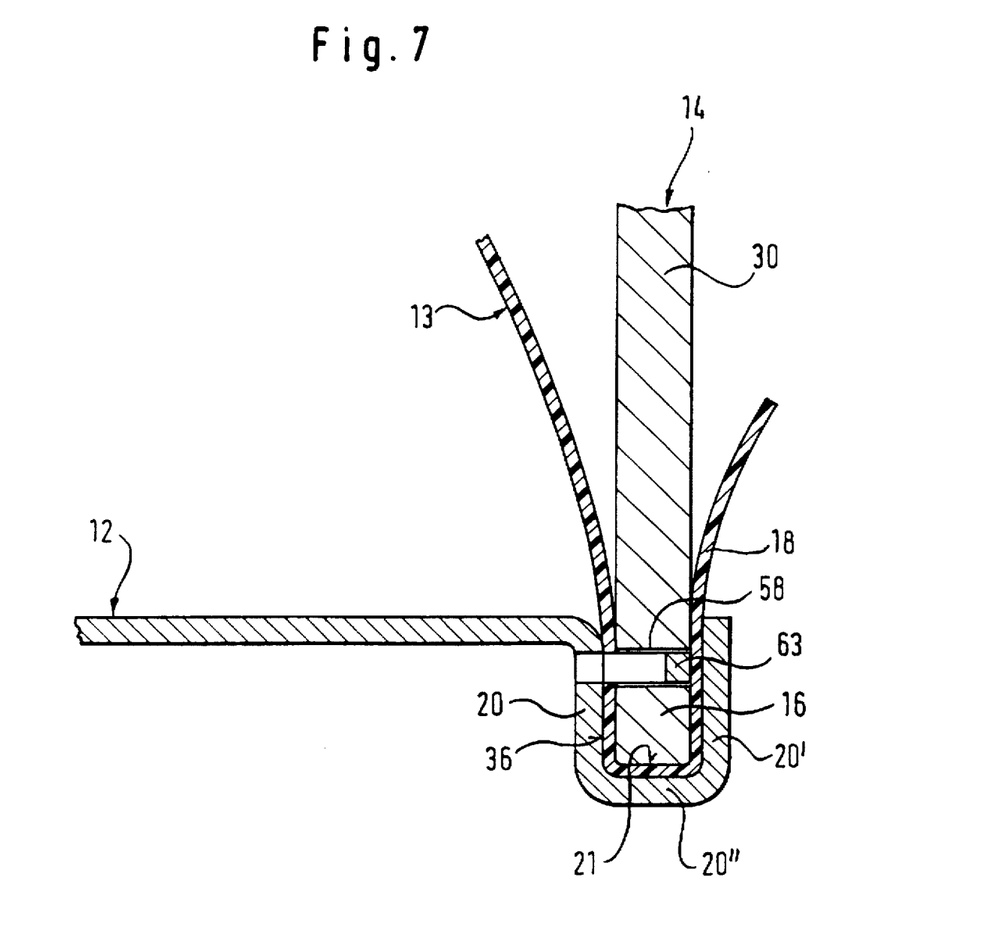

In FIG. 7 there is shown a section of an airbag arrangement which can be formed essentially as described with reference to FIG. 2, with a clamping channel having a substantially U-shaped cross-section adjoining the generator carrier 12 and extending around the axis. The clamping channel 36 is open in the direction towards the base 15 of the cover 14 which is not shown in FIG. 7 and has a base 20" at the oppositely disposed side. Projections in the form of V-shaped webs 63 which project into the clamping channel at specific intervals in the circumferential direction are formed from the inner wall part 20 belonging to the clamping channel 36 and are for example cut out, pressed out or bent out by coining, and these projections engage into complementary recesses 52, at the inner side of the marginal region 16 of the cover, and indeed in such a way that the cover 14 is anchored by the webs in order in this way to prevent the gas generator 12 being pulled out of position.

In accordance with FIGS. 8a–d provision is made in this respect for the projections 63 to be arranged over the entire length of the clamping channel 36 and indeed preferably directly following one another. Their depth corresponds approximately to the width of the clamping channel 36.

When the generator carrier 12 is rectangular and the corner regions are rounded off the manufacture is facilitated in that no material is pressed out into the corner regions which does not significantly impair the anchorage.

Figures 8A, 8C:
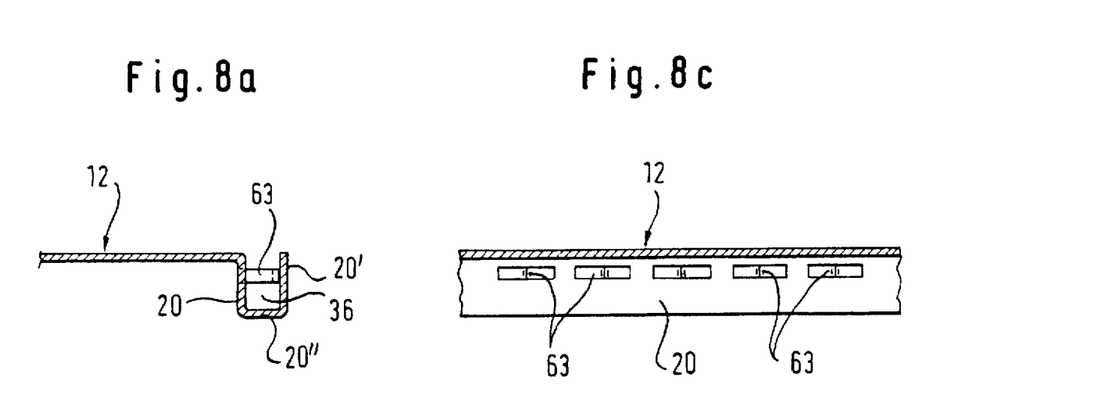
Figures 8B, 8D:
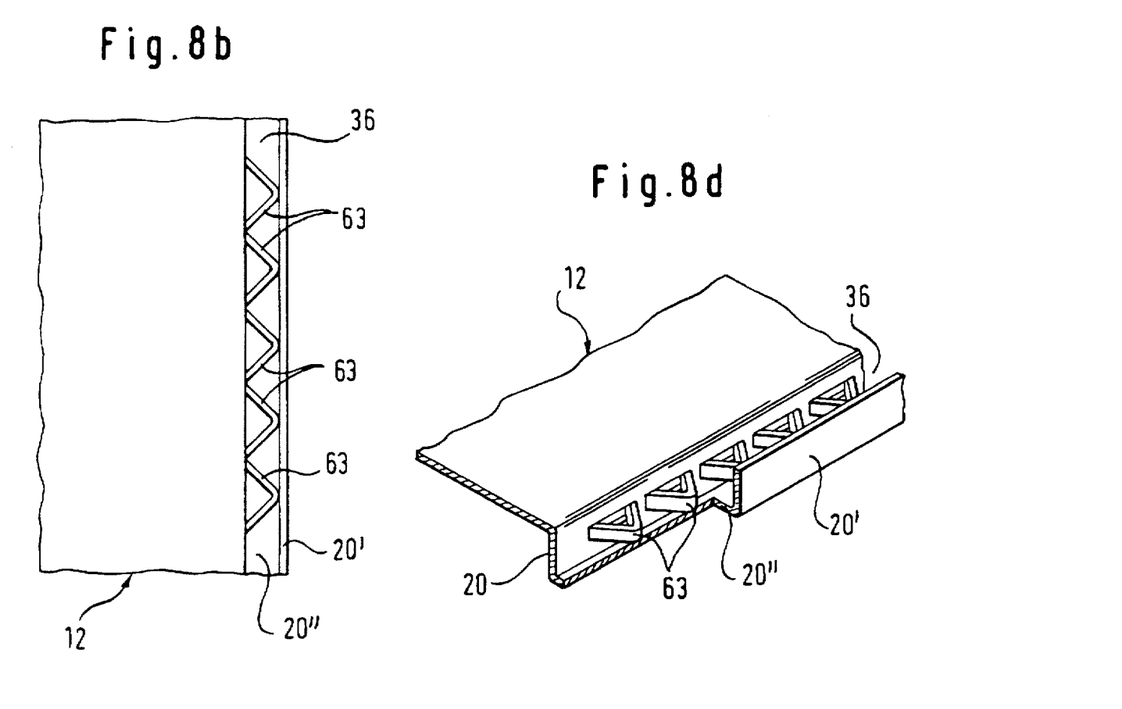

Although the webs 63 in FIGS. 7 and 8 are shown provided at the inner wall 20 of the clamping channel 36 it is straightforwardly possible to provide webs in place of them or in addition to them at the outer wall 20' of the clamping channel 36.

Opposite to the web 63 there is provided recesses 58 in the marginal region 16 of the cover which can be pressed by the webs 63 into the material of the cover 14 which for example consists of elastic. The marginal region 18 of the gas bag 13 at the opening which is laid around the end edge 21 is held tight particularly effectively in this manner.

The manufacture of the gas bag can again take place in the previously described manner in that the gas bag 13 consisting of a folded together part 33 with the marginal region 18 at the opening and the further parts of the arrangement, namely the generator 11, the generator carrier 12 and the cover 14 are, if necessary first separately manufactured, with the cover 14 and the generator 11 which is assembled to the generator carrier 12 initially representing separate components.

In this case the gas bag 13 can be subsequently introduced in folded together form into the inner space of the cover 14 in the manner for example shown from FIG. 1, with the marginal region 18 at the opening being folded around the end edge 21 and thereby coming into contact with the inner wall 19.

The generator carrier 12 which has already been assembled to the gas generator 11, or is formed in one piece therewith, is now inserted axially from the side remote from the base 15 and the gas bag 13, with the wall part 20 sliding along the inner wall of the marginal region of the gas bag 13 at the opening until the desired position has been reached.

Provision can, on the one hand, be made for the webs 63 to have been formed in the generator carrier 12 prior to the assembly of the components. In this arrangement the clamping channel is bent open and is only bent together into its final shape with a suitable tool after having been mounted on the marginal region 16 of the cover while trapping the marginal region at the opening 18. The webs 63 push into the marginal region 16 of the cover and press in the recesses 58. A further possibility consists of first coining the webs when the generator carrier 12 already contacts the marginal region 16 of the cover while trapping the marginal region 18 at the opening.

The marginal region at the opening is now connected in pressure-tight manner to the wall part 20 and to the marginal region 16 of the cover so that a reliable retention of the gas bag in the region of its opening 17 is ensured on triggering of the gas generator 11 and the subsequent inflation of the gas bag 13 while breaking open the base 15 of the cover 14.

Figure 9:
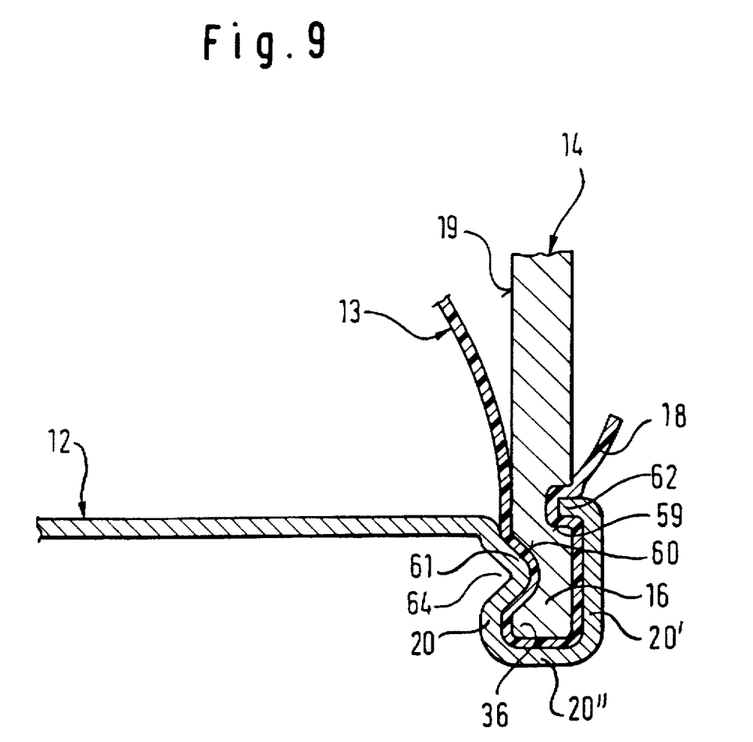
Figure 10A:
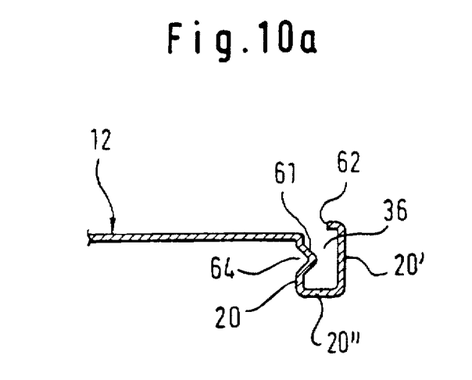
Figure 10B:
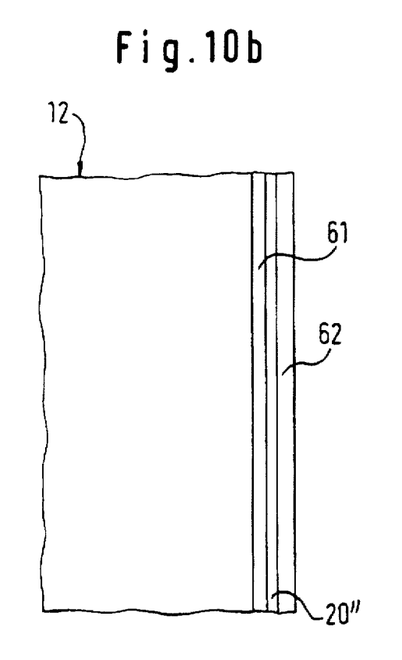
Figure 10C:
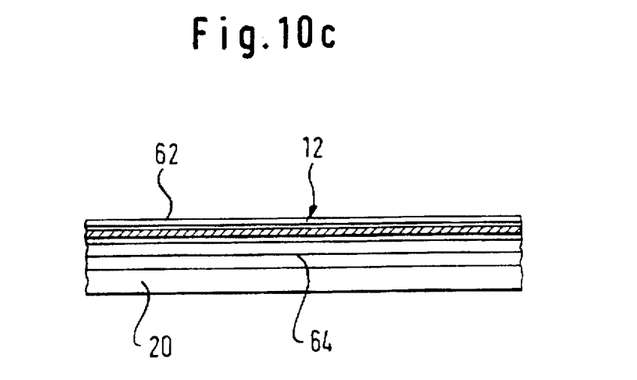
Figure 10D:
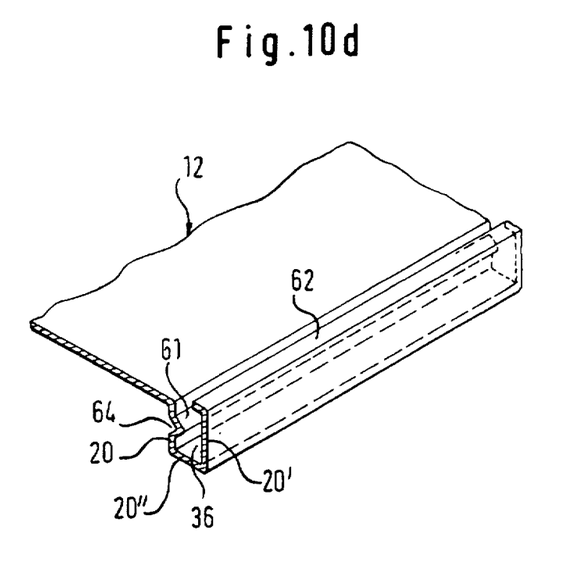

In the embodiment of FIG. 9 which is similar to that of FIG. 2 a clamping channel 36 within an essentially U-shaped cross-section extending outwardly around the axis again adjoins the generator carrier 12. The clamping channel 36 is open towards the base 15 of the cover 14 which is not shown in FIG. 9 and has a base 20" at the oppositely disposed side. In this arrangement the clamping channel 36 is provided at the inner wall with a first projection in the form of the rib 61 extending along the clamping channel 36 and preferably substantially around the latter. The rib 61 can for example be formed by a deep drawing process while forming a recess 64 at the opposite side of the clamping channel wall 20 and can engage with a groove 60 formed at the oppositely disposed cover wall 19. Furthermore, the oppositely disposed outer wall 20' of the clamping channel 36 has a second projection 62 in the form of its edge which is bent down towards the opening, with the opening of the clamping channel 36 being partially covered over as can be particularly clearly seen from FIG. 10 and with the bent over edge 62 engaging with a recess 59 formed in the oppositely disposed outer wall of the marginal region 16 of the cover.

As can be further deduced from FIG. 10 both projections 61, 62 extend over a considerable part of the length of the clamping channel 36. The engagement between the projections 61, 62 and the respective oppositely disposed recesses 60, 59 in the marginal region 16 of the cover 14 brings about an anchorage in such a way that the extraction of the generator 12 out of its position is prevented.

With a rectangular generator carrier with rounded corner regions the manufacture is in turn facilitated when no material is pressed out in the corner regions which does not significantly impair the anchorage. The marginal region 18 of the gas bag 13 at the opening extends between the projections 61 and 62 and the retrospective oppositely disposed recesses 60 and 59 in the marginal region 16 of the cover in the same way as between the wall parts 20 and 20' and the marginal region 16 of the cover, so that the gas bag 13 is particularly effectively held during inflation. In the case the manufacture of the gas bag 13 and of the remaining parts, namely the generator 11, the generator carrier 12 and the cover 14 can, in necessary, also take place separately.

Thereafter the gas bag 13 is first introduced in folded together form into the inner space of the cover 14 in the previously described manner, with the marginal region 18 at the opening being turned around the end edge 21 and thereby coming into contact with the inner wall 19 and the outer wall 22 of the marginal region 16 of the cover. The generator carrier 12 which has already been assembled to the gas generator 11, or which is formed in one piece therewith, is now axially pushed into place from the side remote from the base 15 and the gas bag 13, with the wall part 20 sliding along the inner wall of the margin region 18 of the gas bag 13 at the opening until the desired position is achieved.

During this provision can, on the one hand, be made for the rib 61 and the bent over edge 62 to have already been formed prior to the joining together of the components, with the clamping channel first being bent open and thus broadened and being squashed together with a suitable tool onto the marginal region 16 of the cover only after it has been mounted onto the marginal region 16 of the cover. A further possibility is to first deep draw the projections when the generator carrier already lies on the marginal region of the cover.

After the engagement of the projections 61 and/or 62 with the recesses provided in the wall part 20 the marginal region 18 at the opening is clamped in pressure-tight manner to the wall part 20 and to the marginal regional 16 of the cover, so that a reliable retention of the gas bag 13 is ensured in the region of its opening 17 on triggering of the gas generator 11 and subsequent inflation of the gas bag 13 while breaking open the base 15 of the cover 14.

A preferred airbag arrangement in accordance with the present invention which is particularly suited for passenger seats will be explained with reference to the FIGS. 11 to 14.

In accordance with this embodiment the folded together gas bag 13 is provided in the pot-like cover 14 with the flat base 15 and the wall 30 comprising a rectangle with rounded corners having the central axis 29. The closed end 31 of the gas bag 13 is located directly opposite to the base 15, whereas its opening 17 provided at the oppositely disposed end receives the gas generator 11 which is secured in accordance with FIG. 13 into a circular receiving opening 32 of square plate 65. The gas generator 11 is rotationally symmetrically arranged around the central axis 29 and has gas outlet openings 28 distributed around the periphery above the connection to the generator carrier 12 with hot gas jets emerging radially from the gas outlet openings 28 when triggered.

The region 33 of the gas bag 13 having folds 13' extending perpendicular to the central axis 29 is joined by the margin region 18 at the opening in the direction away from the base 15. The marginal region 18 at the opening generally contacts the inner wall 19 of the wall 30 of the marginal region 16 of the cover. A plurality of axially extending slots 56 are provided in the wall 30 which preferably lie diametrically opposite to each other and which extend axially from the end edge of the marginal region 16 of the cover in the direction towards the base 15. The corners of the marginal region 16 of the cover are more strongly curved in accordance with FIG. 14 than those of the wall part 20 whereby corner spaces 55 are formed. The turn-over folds 18''' of the gas bag which arise in the axial direction during the turning over of the marginal region 18 at the opening outwardly around the planar part 18'', which extends around the generator 11 perpendicular to the central axis 29, are accommodated in these corner spaces 55.

Figure 11:
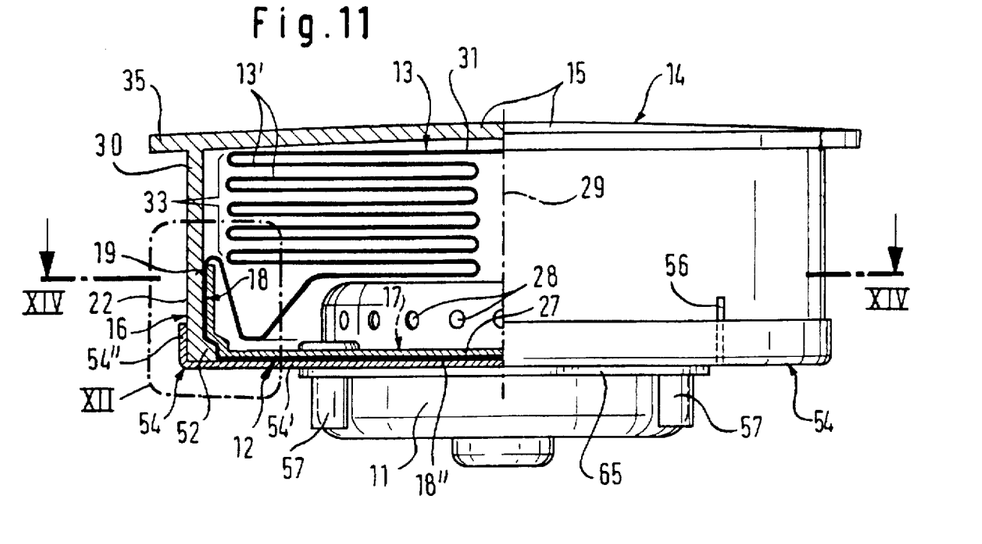

The generator carrier 12 consists of the frame part 27 which surrounds the gas generator 11 and which is rectangular in the illustrated embodiment and overlaps the plate 65 at the inside and of the one-piece outer wall part 20 which is bent in the direction towards the base 15, in particular by deep drawing.

At the side of the frame part 27 remote from the base 15 of the cover 14 there is provided a cover pan 54 having a planar base 54' and a flange 54'' bent over at right angles in the direction of the base 15 of the cover 14. The base 54' has a central opening for receiving the generator carrier 12 and is placed onto the frame part 27 and connected to the latter via fastener elements 57 such as screws, bolts or the like while clamping the marginal region 18 at the opening which is guided along the wall 20 and between the latter and the wall 19 of the marginal region 16 of the cover. In this arrangement the flange 54'' of the cover pan 54 engages around the marginal region 16 of the cover and contacts it from the outside. In this way a bulging out of the marginal region 16 of the cover in the region of the flange 54'' is avoided.

Figure 12:
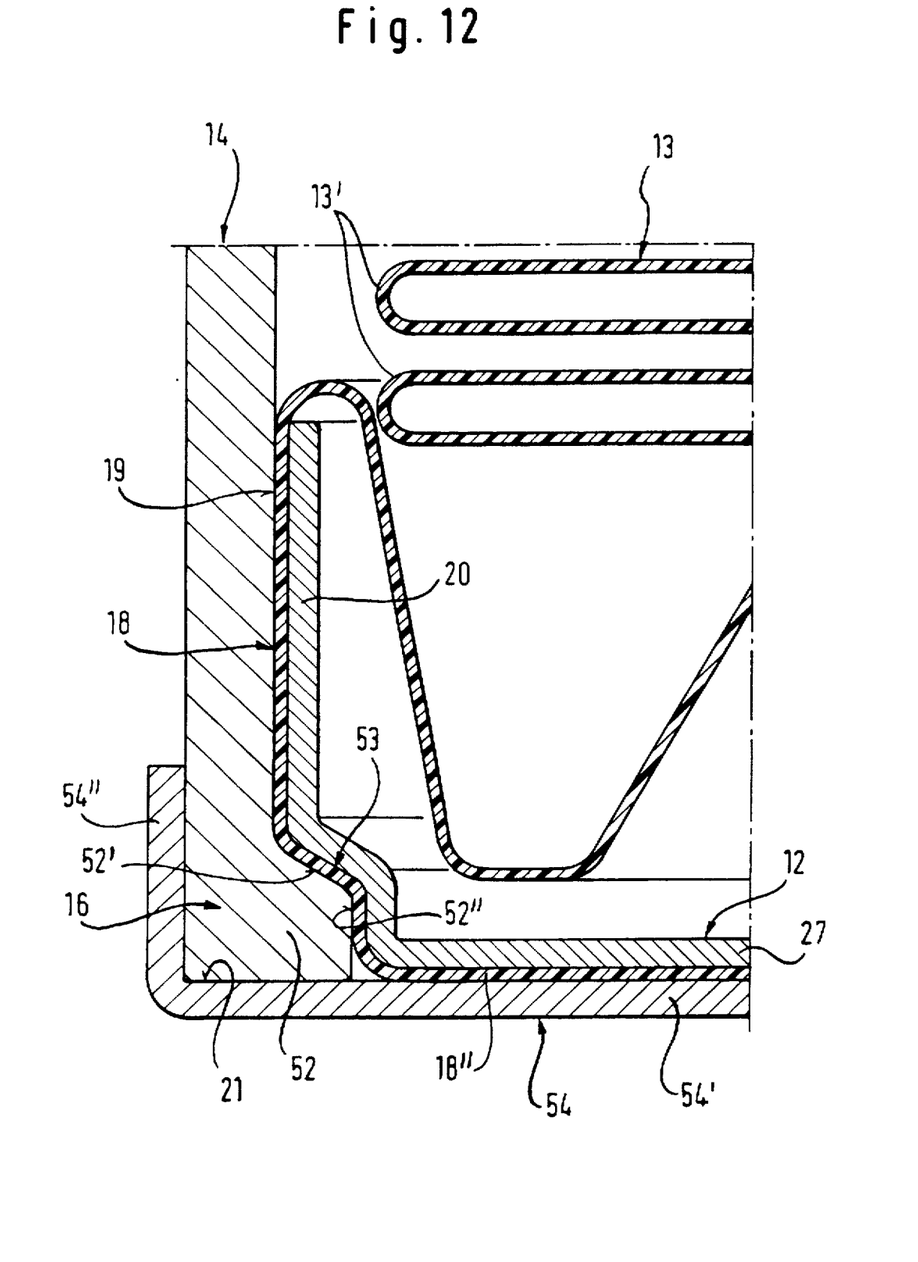
Figure 13:
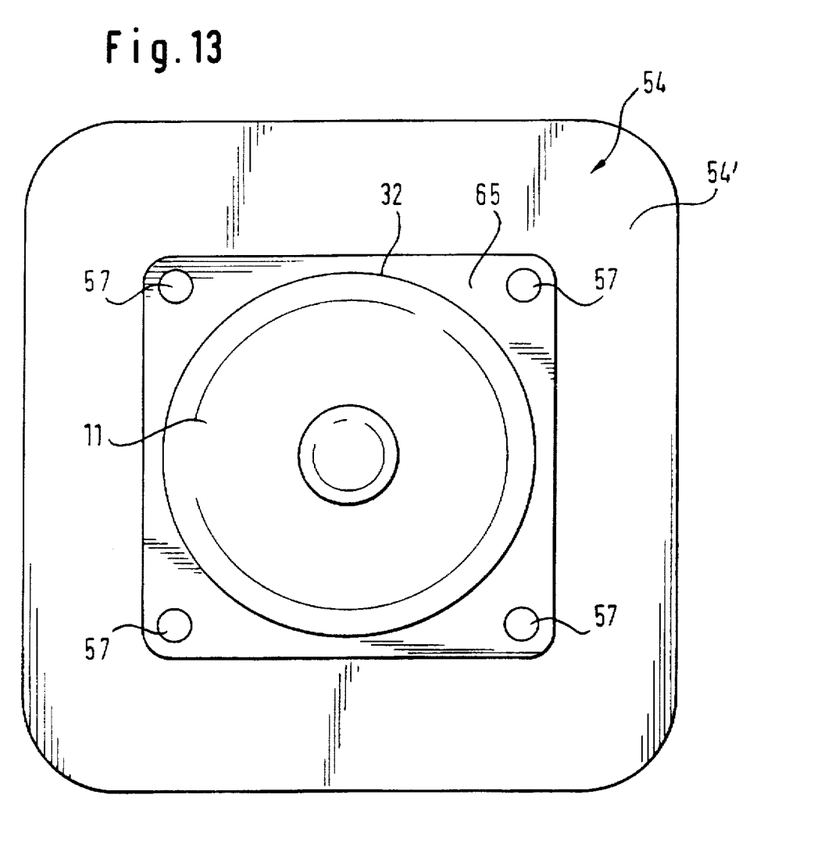
Figure 14:
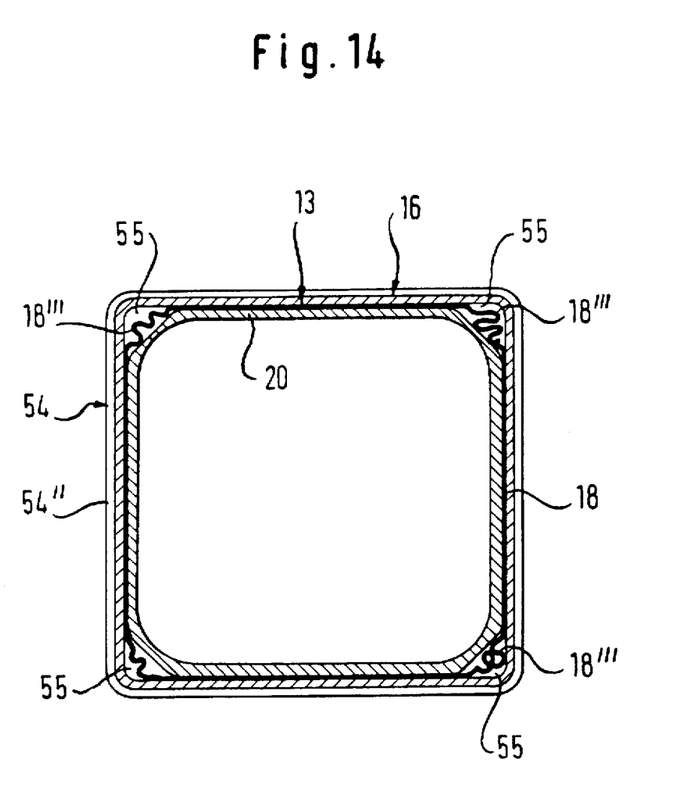

In accordance with the invention the marginal region 16 of the cover at the end region remote from the base 15 of the cover 14 has an inwardly broadened rib 52 which stands in engagement with a complementary recess of the wall part 20 in such a way that the generator carrier 12 is held axially in both directions while clamping the marginal region 18 at the opening following the connection with the cover pan 54. The boundary 52' of the rib 52 of the recess 53 remote from the base 54' thereby expediently extends obliquely to the central axis 29. The boundary of the rib 52 remote from the base is flush with the marginal region 16 of the cover and lies together with the latter against the base 54'. The boundary 52'' of the rib 52 or of the recess 53 facing the central axis 29 extends in the axial direction.

The individual parts can be assembled in different ways.

Preferably the generator carrier 12 is first introduced into the marginal region 18 of the gas bag 13 at the opening in such a way that the marginal region 18 at the opening extends along the wall part 20 and then along the planar frame part 27. The cover 14 is then pushed axially onto the wall part 20, with the marginal region 16 at the cover being resiliently spread apart between the axial slots 56 by the wall part 20 until the projections 52 which slide along the wall part 20 and the gas bag 13 can snap into the recesses 53. At the same time the turn-over folds 18''' enter into the corner spaces 55 provided therefor.

The gas generator 11 with the plate 65 and the cover pan 54 are secured to the frame part 27 by fastener elements 57 from the base 15 while clamping the planar part 18'' of the marginal region 18 at the opening between the frame part 27 and the base 54'. The flange 54'' of the cover pan 54 engages around the marginal region 16 of the cover. The fastener elements 57 which axially clamp together the frame part 27, the base 54' and the plate 65 lying thereon, ensure that the generator 11 and also the generator carrier 12 and the cover pan 54 are reliably held together axially in both directions.

In this manner the marginal region 16 of the cover is surrounded in reinforcing manner by the flange 54'' so that the marginal region 16 of the cover cannot bulge into the region surrounded by the flange 54'' and so that the marginal region 18 at the opening remains securely clamped there and between the plate-like frame part 54'' on triggering of the gas generator 11 and the subsequent expansion of the gas bag 13 while breaking open the base 15 of the cover 14.

The quadratic or circular opening 17 of the gas bag 13 surrounds, in accordance with FIG. 11, the preferably right-cylindrical outer wall of the generator 11 or lies opposite to it at a small radial spacing. The planar part 18" of the marginal region 18 which directly surrounds the opening 17 and extends outwardly up to the end of the planar plate-like frame part 27 is flat after being clamped between the frame part 27 and the base 54' so that a mechanically firm and gas-tight connection is provided there. The folds 18'" which result on laying the marginal region 18 of the opening into the axial direction along the wall part 20 are accommodated as already described above with reference to FIG. 14 in the corner spaces 55 which are provided for this purpose.

What is claimed is:

1. An airbag assembly for motor vehicles comprising:

a pot-shaped cover having a base portion and a wall portion extending away from the base and a marginal region of the cover wall portion including an end thereof remote from the base;

at least one gas generator;

a generator carrier having a peripheral portion for receiving the marginal region of the cover wall portion and having apertures formed at intervals therealong; and a folded-up gas bag in the cover for being expanded by gas from the gas generator and breaking open the cover base portion, the marginal region including end sections at the apertures of the peripheral portion of the generator carrier, the marginal region end sections having a first state with the sections in a first configuration, and a second state with the sections in a second configuration that is different from the first configuration for cooperating with the generator carrier peripheral portion and apertures thereof to attach the cover to the generator carrier without requiring bending and crimping of the cover wall portion.

2. Arrangement in accordance with claim 1 wherein said gas bag includes a gas bag opening for receiving the gas generator and has a marginal region free from beads and inserts extending around the bag opening with the bag marginal region clamped securely between the cover wall portion marginal region and the generator carrier peripheral portion.

3. The assembly of claim 1 wherein the cover is of a thermoplastic material and the marginal region end sections are heated to a flowable state to change from the first state to the second state.

4. An airbag assembly for motor vehicles comprising:

a pot-shaped cover having a base portion and a wall portion extending away from the base and a marginal region of the cover wall portion including an end thereof remote from the base;

at least one gas generator;

a generator carrier having a peripheral portion for receiving the marginal region of the cover wall portion and having apertures formed at intervals therealong; and a folded-up gas bag in the cover for being expanded by gas from the gas generator and breaking open the cover base portion, the marginal region including end sections at the apertures of the peripheral portion of the generator carrier that have a first configuration before being attached to the carrier peripheral portion, and a second configuration that is different from the first configuration and including a pair of oppositely directed step surfaces that extend transversely to the cover wall portion for cooperating with the generator carrier peripheral portion and apertures thereof to attach the cover to the generator carrier, wherein said gas bag includes a gas bag opening for receiving the gas generator and has a marginal region free from beads and inserts extending around the bag opening with the bag marginal region clamped securely between the cover wall portion marginal region and the generator carrier peripheral portion, and the cover wall marginal region has an inner wall surface and an outer surface and a marginal region of the bag at the opening is laid around the end of the marginal region of the cover and the laid around bag marginal region is held at the outer wall surface of the marginal region of the cover.

5. An airbag assembly for motor vehicles comprising:

a pot-shaped cover having a base portion and a wall portion extending away from the base and a marginal region of the cover wall portion including an end thereof remote from the base;

at least one gas generator;

a generator carrier having a peripheral portion for receiving the marginal region of the cover wall portion and having apertures formed at intervals therealong; and a folded-up gas bag in the cover for being expanded by gas from the gas generator and breaking open the cover base portion, the marginal region including end sections at the apertures of the peripheral portion of the generator carrier that have a first configuration before being attached to the carrier peripheral portion, and a second configuration that is different from the first configuration and including a pair of oppositely directed step surfaces that extend transversely to the cover wall portion for cooperating with the generator carrier peripheral portion and apertures thereof to attach the cover to the generator carrier, and wherein a fused connection is provided between the marginal region of the cover and the generator carrier.

6. The assembly of claim 5 wherein the fused connection is provided between the cover, the generator carrier and the gas bag.

7. A method of assembling an airbag assembly that includes a cover and a carrier for a gas generator, the method comprising:

providing openings in a peripheral portion of the generator carrier;

arranging a wall marginal region of the cover and the peripheral portion of the carrier so that end sections of the cover wall marginal region are at the openings of the carrier peripheral portion; and reducing the marginal region end sections to a flowable state to change the shape of the wall end sections for attaching the cover to the carrier.

8. The method of claim 7 wherein application of heat causes the sections to flow in the peripheral portion openings and to form a step surface extending transverse to the cover wall.

9. The method of claim 8 wherein the application of heat causes two step surfaces to form extending opposite to each other at each opening of the carrier peripheral portion.

* * * * *

UNITED STATES PATENT AND TRADEMARK OFFICE
CERTIFICATE OF CORRECTION

PATENT NO. : 5,762,361
DATED : June 9, 1998
INVENTOR(S) : Herrmann et al.

It is certified that error appears in the above-indentified patent and that said Letters Patent is hereby corrected as shown below:

ON THE TITLE PAGE:

Item "[73] Assignee:" change "Takata (Europe) Safety Technology GmbH" to --Takata (Europe) Vehicle Safety Technology GmbH--.

Signed and Sealed this

Twenty-fourth Day of November, 1998

Attest:

BRUCE LEHMAN

Attesting Officer

Commissioner of Patents and Trademarks